July 5, 1938.　　　J. W. LEIGHTON　　　2,123,087
INDIVIDUAL WHEEL SUSPENSION
Filed July 18, 1935　　　3 Sheets-Sheet 2
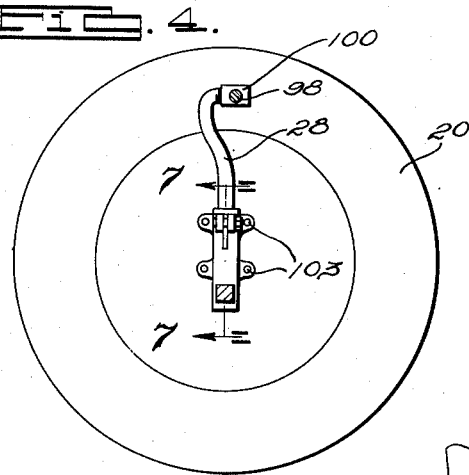
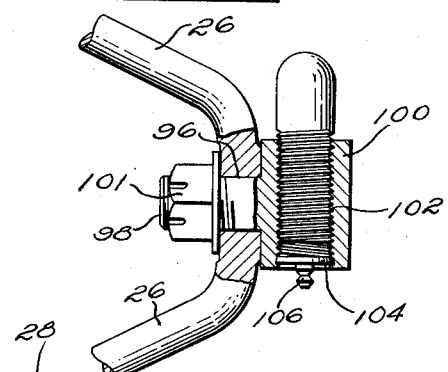
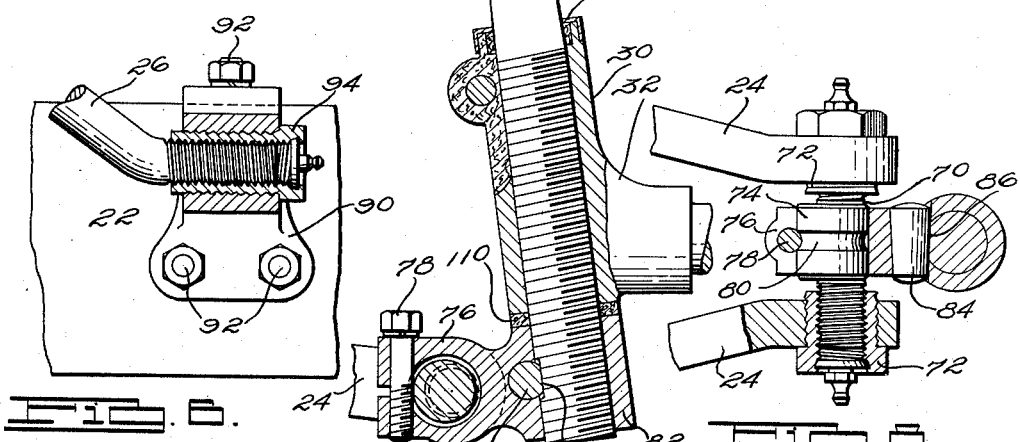
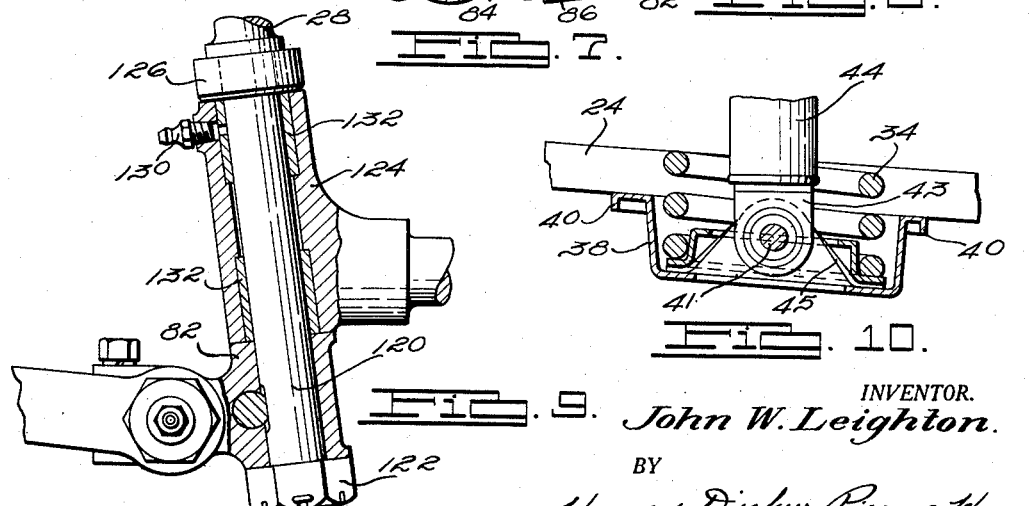
INVENTOR.
John W. Leighton.
BY
Harness, Dickey, Pierce & Hann.
ATTORNEYS.

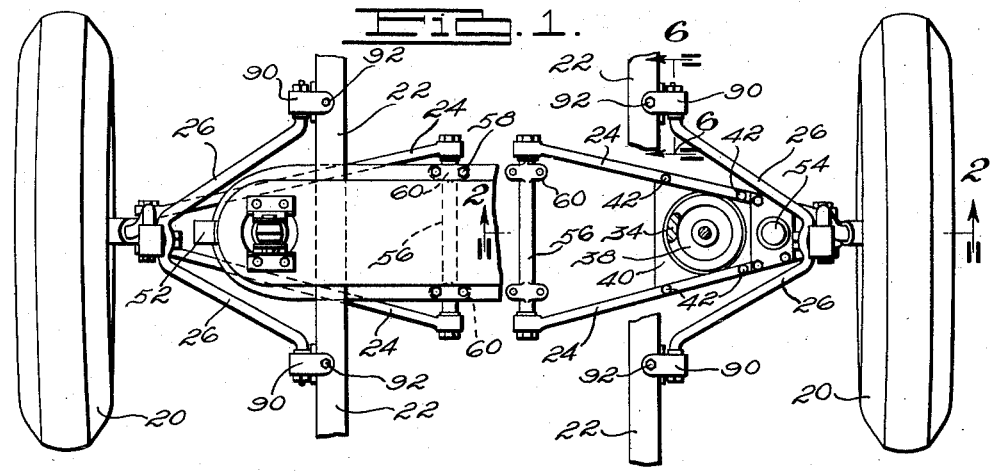
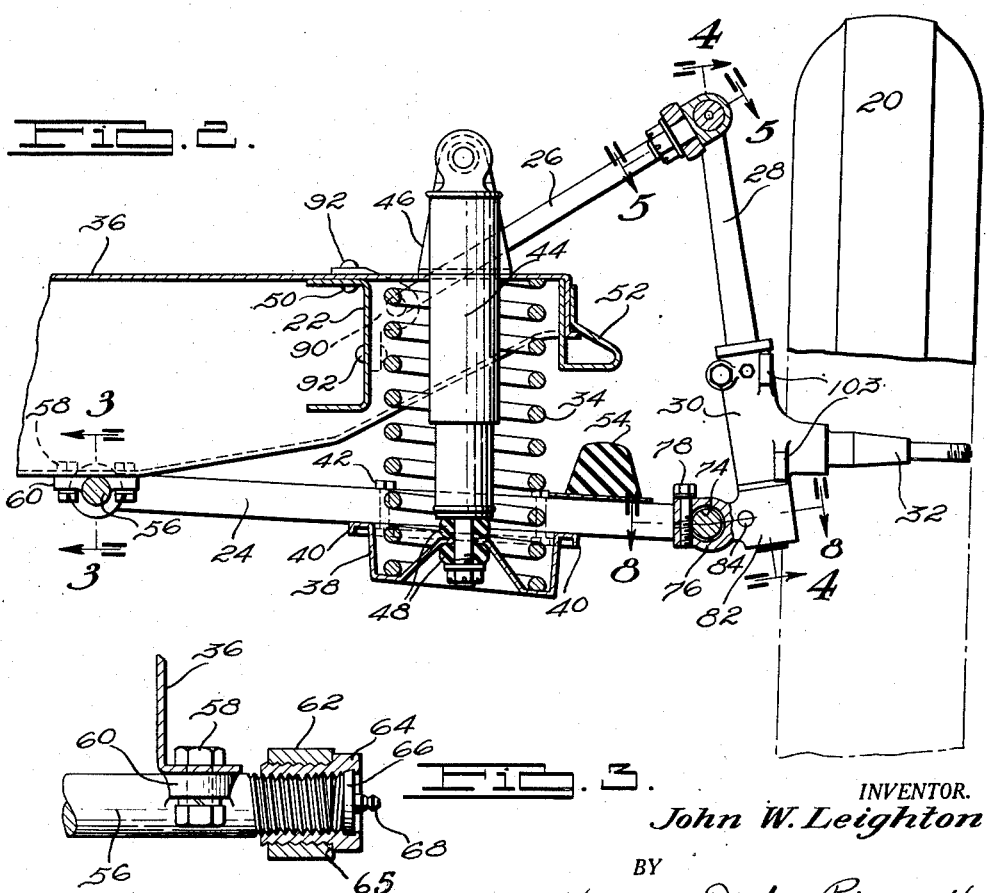

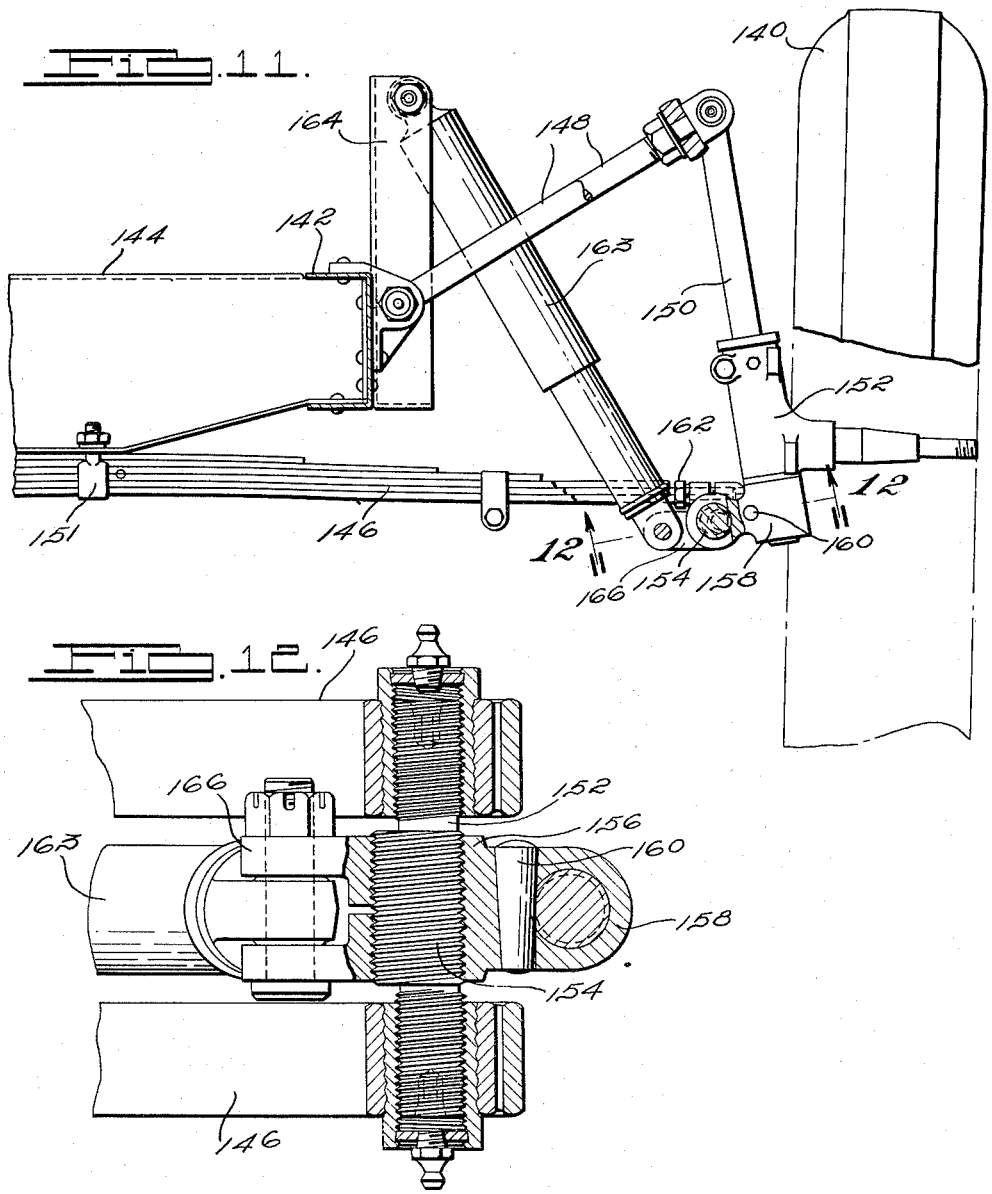

UNITED STATES PATENT OFFICE 2,123,087

INDIVIDUAL WHEEL SUSPENSION

John W. Leighton, Port Huron, Mich.

Application July 18, 1935, Serial No. 31,986

10 Claims. (Cl. 280—96.2)

The present invention relates to wheel suspensions, and particularly to constructions of the individual wheel suspension type.

It is an object of the present invention to provide a wheel suspension for vehicle wheels adapted to minimize vehicle tire wear, and to improve the stability of a vehicle during travel both on straightaways and on curves.

It is a further object of the present invention to provide a vehicle wheel suspension constructed to cause a vehicle wheel to slant with respect to the chassis in accordance with the relative positions of the vehicle wheel support and the vehicle chassis.

It is a further object of the present invention to provide a vehicle wheel suspension so constructed that a change in the relative position of a vehicle chassis and a vehicle wheel, such as results from the tilting of a vehicle in rounding a curve, automatically effects a corresponding slanting of such vehicle wheel.

It is a further object of the present invention to provide a construction of the last mentioned type in which such relative movement causes the upper edge of a wheel on one side of the vehicle to swing outwardly from the vehicle chassis and causes a corresponding portion of a wheel on the opposite side of the vehicle to swing inwardly with respect to the vehicle chassis.

It is a further object of the present invention to provide a vehicle wheel suspension as above stated in which, in rounding a curve, the upper edge of the inside vehicle wheel swings outwardly from the chassis and the upper edge of the outside vehicle wheel swings inwardly with respect to the chassis.

It is a further object of the present invention to provide a vehicle wheel suspension of the last mentioned type in which the swinging of the vehicle wheels is introduced automatically by the tilting of the vehicle wheel supports with respect to the vehicle chassis.

It is a further object of the present invention to provide a vehicle wheel suspension as above stated, so constructed that the slanting of the individual vehicle wheels is effected without changing the toe-in of the wheels.

It is a further object of the present invention to provide a vehicle wheel suspension in which both ends of a supporting king pin for a wheel spindle are pivotally connected to the vehicle chassis to provide for relative movement between such support and chassis.

It is a further object of the present invention to provide a wheel suspension of the last mentioned type in which the respective ends of the king pin are connected to the chassis through different radii and at different distances from the center of rotation of the chassis, so that relative movement between the chassis and the support causes one end of the support to move inwardly or outwardly with respect to the chassis.

It is a further object of the present invention to provide a wheel suspension of the last mentioned type in which an increase in the spacing between the king pin support and the chassis causes the upper edge of an associated vehicle wheel to swing outwardly from the chassis, and in which a decrease in the spacing between the chassis and the king pin support causes such wheel edge to move inwardly with respect to the chassis.

It is a further object of the present invention to provide a vehicle wheel suspension of the last mentioned type in which the pivotal connection between the respective ends of the king pin support and the chassis are located on a common center line so that the slanting of the vehicle wheels as above stated is not accompanied by a change in the toe-in of the vehicle wheels.

It is a further object of the present invention to provide a vehicle wheel suspension embodying upper and lower wishbones connected respectively to the chassis and to the respective ends of a king pin, and embodying spring mechanism interposed between the chassis and one of said wishbones.

It is a further object of the present invention to provide a vehicle wheel suspension embodying a wishbone, the respective ends of which are pivotally connected to the chassis and to one end of a king pin support, and embodying a cross spring, connected respectively to the chassis and to the other end of the king pin support.

It is a further object of the present invention to provide a vehicle wheel suspension embodying wishbone connections between a chassis and a king pin support and embodying mechanism associated with one of said wishbones for adjusting the camber and caster of the vehicle wheels.

It is a further object of the present invention to provide a vehicle wheel suspension of the individual type and embodying improved threaded bearing constructions between the respective relatively movable parts of the assembly.

It is a further object of the present invention to generally improve and simplify vehicle wheel suspensions of the individual type and to provide a construction which is economical of manufacture, assembly and adjustment.

Other objects and advantages of the present invention appear in the following description and in the appended claims.

In the accompanying drawings, throughout which corresponding reference characters are used to designate corresponding parts:

Figure 1 is a top plan view of an illustrative embodiment of the present invention;

Fig. 2 is a view, partly in vertical section, taken along the line 2—2 of Fig. 1;

Fig. 3 is a view, partly in vertical section, taken along the line 3—3 of Fig. 2;

Fig. 4 is a view in vertical section, taken along the line 4—4 of Fig. 2;

Fig. 5 is a view, partly in horizontal section, taken along the line 5—5 of Fig. 2;

Fig. 6 is a view in partial vertical section, taken along the line 6—6 of Fig. 1;

Fig. 7 is a view in vertical section, taken along the line 7—7 of Fig. 4;

Fig. 8 is a view in partial horizontal section, taken along the line 8—8 of Fig. 2;

Fig. 9 is a view in partial vertical section of a modified construction corresponding to Fig. 7;

Fig. 10 is a fragmentary view of a modified spring connection which may be used in the practice of the present invention;

Fig. 11 is a view in elevation of a modified embodiment of the present invention, adapted for suspensions of the cross spring type; and Fig. 12 is a view in horizontal section, taken along the line 12—12 of Fig. 11.

In its broader aspects, the present invention is directed to improvements in vehicle wheel suspensions designed to improve the stability of a vehicle, and to reduce tire wear, particularly during the rounding of curves. In accordance with the present invention, the connection between each vehicle wheel support and the vehicle chassis is such that, in rounding a curve, the upper part of a wheel on the inside of the curve swings outwardly from the chassis, and the upper edge of a wheel on the outside of the curve swings inwardly toward the chassis. Stated in another way, the vehicle wheels swing into a curve in much the same manner as do the wheels of motor cycles or bicycles. With this arrangement the slippage between a vehicle tire or rim and the supporting roadway heretofore incident to the rounding of a curve is substantially eliminated and the tire wear is correspondingly reduced. The stability of the vehicle is also substantially improved, since each individual wheel, by slanting into a curve, rolls freely in the curve and is not influenced by tire slippage or other unstable factors.

The tilting or slanting of the vehicle wheels preferably occurs automatically as an incident to the operation of the vehicle. In accordance with the preferred embodiment of the present invention, the slanting of the several vehicle wheels is controlled in accordance with the spacing between the vehicle chassis and the respective wheel supports. As will be understood, a vehicle body tends to tilt and to move transversely with respect to the supporting wheels when the vehicle is rounding a curve. This tilting is outward of the curve, and tends to increase the spacing between the chassis and the wheels on the inside of the curve, and to decrease the spacing between the chassis and a wheel on the outside of the curve. The tilting, or change in spacing thus introduced, is proportional to the rate of travel of the vehicle and the curvature of the curve being rounded, and, in accordance with the present invention is utilized to determine the slanting of the respective wheels. In the form illustrated, an upward tilting of the vehicle body with respect to a wheel causes the upper side of that wheel to move outwardly from the chassis or to lean away from the vehicle. Similarly, a downward tilting of the chassis with respect to a wheel causes the upper part of such wheel to lean inwardly with respect to the chassis. In rounding a curve accordingly, the wheels automatically lean into the curve.

In accordance with each of the illustrated embodiments of the present invention, each vehicle wheel is supported on a spindle secured upon a king pin. Opposite ends of the king pin are connected to the chassis through links which are of differing lengths and which are disposed at an angle to each other. The connections between the links and the king pin and the chassis are pivotal, so that a tilting of the chassis with respect to the king pin support, causes each link to rotate about its pivotal support. Due to the difference in length of the several links, and the angularity between them, this rotation produces a substantially greater movement of one end of the king pin than of the other, thus inclining the king pin toward or away from the chassis. The inclining movement of the king pin is, of course, transmitted to the associated wheel.

In further accordance with the present invention the slanting of the several wheels, effected during the rounding of curves in response to the tilting of the vehicle chassis, is accomplished without changing the degree of toe-in of the respective wheels. As illustrated, the connections of the several links mentioned above to the chassis are on parallel center lines, so that a change in slant of an individual wheel occurs in a plane parallel to a transverse axis of the chassis and does not change the toe-in of the wheel.

As will appear from a complete understanding of the present invention, the principles above described are applicable to various types of spring suspensions, and are also applicable to both front and rear wheel suspensions. Two adaptations for front wheel suspensions are illustrated in the drawings. One of these is of the vertical spring type of individual wheel suspension and the other is of the cross spring type of individual wheel suspension.

Considering the illustrated forms of the invention in more detail and referring particularly to Figs. 1 and 2, each wheel 20 of a front pair is suspended from a vehicle chassis having side frame members 22, through lower wishbone members 24, an upper wishbone 26, a king pin 28, knuckle bracket 30, and spindle 32. Load is transmitted between the chassis and the wheel through a spring 34 individual to each wheel which is seated between the underside of a transverse chassis member 36 and a spring well 38. In accordance with conventional construction well 38 is drawn from a plate 40 secured to the lower wishbone members 24 in any suitable manner, as by studs 42. Preferably, and as illustrated, a shock absorber 44 which may be of any desired construction is associated with each spring 34 and is pivotally supported between a clevis 46 secured to the transverse member 36 in any desired manner, and the other end of which is secured to the cup 38 between the compressed but resilient pads 48. As will be understood, pads 48 permit a certain amount of rocking of the lower end of shock absorber 44 with respect to cup 38. Alternatively, as shown in Fig. 10, the lower end of shock absorber 44 may be formed with a boss 43 for pivotal mounting by pin 41 in a clevis 45 struck upwardly from the base of well 38.

The frame members 22 and the transverse member 36 may be of any desired construction and are illustrated as rigidly connected together by one or more rivets 50. A stop 52 secured at each end of member 36 cooperates with a resilient pad 54 to limit compression of each spring 34 and the associated shock absorber 44.

The members 24 of each lower wishbone are preferably circular in cross section and the inner ends thereof are pivotally connected to a shaft 56 rigidly secured to member 36 by studs 58 which pass through lugs 60 formed thereon. In accordance with the construction disclosed and claimed in Patent No. 1,924,448, granted August 29, 1933, to the present applicant, a threaded bearing is provided between each member 26 and shaft 56. Referring particularly to Fig. 3, each end of shaft 56 is threaded to receive a bushing 64 with a bearing fit. Bushing 64 is externally threaded to freely receive the boss 62 formed at the end of the associated member 26. The inner and outer threads on the bushings are of the same pitch. The outer threads are cut relatively light and present side faces at obtuse angles to each other. In assembly each bushing 64 is simultaneously threaded into boss 62 and shaft 56, and upon engagement of the inner shoulder 65 of bushing 64 with the edge of boss 62, an end thrust is introduced which causes the shallow threads to engage with a clutch action and non-rotatably secure the two members together. A welch washer 66 is provided to close the extended end of each bushing 64 and also accommodates a suitable fitting 68 through which lubricant may be introduced.

Referring particularly to Figs. 2, 7 and 8, the outer ends of members 24 of each lower wishbone are pivotally mounted upon a shaft 70, through a threaded bearing connection comprising a bushing 72, in all respects as described in connection with Fig. 3. Shaft 70 also comprises an intermediate unthreaded portion 74, eccentrically formed with respect to the threaded end sections. The eccentric section 74 forms a support for a split bracket 76, which may be centered thereon and non-rotatably secured with respect thereto by a stud 78 which passes through openings formed in the rear portions of the bracket, and enters an annular recess 80 formed in the bearing section 74. As described in more detail later, the eccentric bearing portion 74, is provided to adjust the caster and camber of the associated wheel.

Bracket 76 also comprises a boss portion 82, which is internally threaded to receive the lower end of king pin 28, the outer surface of which is provided with corresponding threads. A tapered locking pin 84 is preferably provided to pass through an opening formed in boss 82, and to enter a recess 86 cut in king pin 28, and non-rotatably secures the latter within boss 82.

Referring particularly to Figs. 1, 2, 4 and 5, each upper wishbone 26 is formed of a single piece bent into substantially U-shape. The ends thereof are connected to brackets 90, which are secured to frame members 22 by studs 92. A threaded bearing connection of the type described in connection with Figure 3, and comprising a bushing 94, is provided between each end of member 26, and each associated bracket 90. Wishbone 26 is provided with an opening 96 intermediate its ends, to accommodate a stud 98, the outer end 100 of which is upset and is provided with the threaded opening 102. A nut 101 is provided to draw the upset portion 100 into engagement with arm 26 and secure the members in non-rotatable relation. The upper portion of king pin 28 is offset somewhat from the axis of the lower end 70 thereof, and the end thereof is turned at right angles to such axis. External threads on such end portion 28 mate with the internal threads in the upset portion 100, to provide a rotatable threaded bearing connection between king pin 28 and the upper wishbone members 26. The welch washer 104 is provided to close the end of the upset portion 100, and also accommodates a suitable lubricant fitting 106.

The respective wheels 20 may be secured upon king pins 28 in any suitable manner. The preferred construction is illustrated in Figs. 2 and 7, and comprises a knuckle bracket 30, with which a spindle 32 is integrally formed. Knuckle bracket 32 is preferably of the split, adjustable type disclosed and claimed in the co-pending application of the present applicant, Serial No. 34,337, filed August 2, 1935, now Patent No. 2,082,250. Briefly, bracket 30 is provided with internal threads which mate with corresponding external threads provided on king pin 28, to provide a threaded bearing between these members, the bearing stresses being distributed over the face of the entire thread length. As shown, a spacer 110 is provided between the lower end of bracket 30 and bracket 82 to act as a lubricant seal. The upper end of bracket 30 is correspondingly sealed by a packing gland 112. Illustrative tie rod and steering rod connections are represented by the elements 103.

Alternatively, the non-threaded construction shown in Fig. 9 may be utilized, in which event the lower end of king pin 28 is formed as a trunnion 120, the extremity of which is threaded to accommodate a nut 122. With this construction, the knuckle 124 is both slidably and rotatably fitted over trunnion 120, the lower end thereof bearing against the boss 82, and the upper end thereof bearing against a collar 126 formed on king pin 28. Lubricant may be introduced through a suitable fitting 130. Spaced bushings 132, interposed between trunnion 120 and knuckle bracket 124, define a suitable lubricant well.

It will be seen that both upper and lower king pin supporting wishbones associated with each wheel 20 are pivotally connected at one end to the vehicle chassis and are pivotally connected at the other end to the king pin 28. With this arrangement, any tilting of the chassis with respect to a wheel 20, incident for example to the rounding of a curve, is accompanied by a swinging of the wishbones 24 and 26 about their respective pivotal chassis and king pin connections. The point of connection to the chassis of each of arms 26 is nearer the outer edge thereof than the corresponding pivot for the arms 24 (the chassis longitudinal center line being assumed to be slightly to the left of the support for shaft 56 in Fig. 2), and is accordingly farther from the center of tilting of the chassis than the corresponding pivot points for the arms 24. Arms 26 are also shorter than arms 24 and are angled with respect to arms 24. With this relation, a given tilting of the chassis with respect to a wheel 20 results in a substantially greater inward or outward movement of the pivot point for an arm 26 than for an arm 24, and consequently a greater swinging motion is imparted to the upper end of king pin 28 than to the lower end. A clockwise tilting of the chassis, as viewed in Fig. 2, such as would be encountered in rounding a curve with the wheel 20 of Fig. 2 on the outside, tends to move arms 24 and 26 to the left. As above stated, however, the inward movement of arms 26 is greater than that of arms 24, and wheel 20 accordingly slants toward the chassis, or slants into the curve. A counter-clockwise tilting, as viewed in Fig. 2, such as would be encountered in rounding a curve with wheel 20 on the inside, produces an opposite action, tilting wheel 20 away from the chassis, but inwardly of the curve. In operation, accordingly, the wheels 20 slant into a curve in the manner familiar in motorcycles, bicycles, etc. This action has been found to materially reduce tire wear and to improve the stability of the vehicle.

It will be understood that any desired relation between the degree of tilting of king pin 28 and the tilting between the chassis and associated wheel is available by properly relating the lengths of the wishbone arms 26 and 24, and by properly locating the pivotal connections thereof to the chassis. In accordance with the preferred arrangement, as illustrated in Fig. 2, with the assembly in a free or unsprung condition, a line through the longitudinal axis of an arm 26, as viewed in Fig. 2, passes through the shaft 56 which supports the inner ends of the arms 26. The preferred arrangement is also such, as best shown in Fig. 1, that center lines drawn through the upper and lower wishbones 24 and 26 are parallel, so that the inward or outward swinging of the king pin 28 with respect to the chassis, does not change the toe-in of the associated wheel.

It will be understood that caster may be given each wheel 20 by slanting the knuckle bearing portion of each king pin 28 so that a line drawn through the axis of such bearing portion thereof intersects the supporting roadway at a point in advance of the point at which the associated wheel engages the roadway. The caster as well as the camber, may also be conveniently adjusted in accordance with the illustrated form of the present invention by releasing each stud 78 (Fig. 7) to permit rotation of the eccentric bearing section 74 within the bracket 76. As will be evident, this rotation forces the lower end of king pin 28 to the right or the left as viewed in Fig. 7, correspondingly modifying the camber and caster of the associated wheel.

Referring to the construction shown in Figs. 11 and 12, which is an adaptation of the present invention to wheel suspensions of the cross spring type, an illustrative wheel 140 is suspended from a chassis having a side frame 142 and a cross member 144, through a pair of conventional leaf springs 146, a wishbone 148, king pin 150 and knuckle bracket 152. Wishbone 148 may correspond in all respects to the upper wishbone 26, and may be pivotally secured to the frame member 142 and to the upper end of king pin 150 in the manner described in connection with the first embodiment. Similarly, knuckle bracket 152 is preferably of the construction described in connection with the first embodiment and is associated with king pin 150 in the same manner.

The several leaf springs 146 may be connected to the cross frame member 144 in any suitable manner as by the shackles 151. The outer ends thereof have a threaded bearing connection with a shaft 152, which may follow the construction described in detail in connection with Fig. 3. The mid-section 154 of shaft 152 is eccentrically formed with respect to the threaded end sections, and has a threaded connection with a connecting bracket 156. The boss portion 158 of bracket 156 is threadably secured to the lower end of king pin 150 in the manner described in connection with Fig. 2, and is non-rotatably secured with respect thereto by the tapered locking pin 160. The portion of bracket 156 associated with the eccentric section 154 is split, as shown in Fig. 11, and the stud 162 is provided to restrict such portion into rigid engagement with the eccentric portion 154. It will be understood that by releasing stud 162, a caster and camber adjustment may be effected as described in connection with the first embodiment. The just described adjustable connection is claimed in applicant's copending application, Serial No. 185,794, filed January 20, 1938, as a continuation in part hereof.

Preferably, and as illustrated, a shock absorber 163, of suitable type is connected between the chassis and the outer end of the springs. As illustrated, an arm 164 extends upwardly from the chassis and provides a pivotal mounting for one end of shock absorber 163. The lower end of shock absorber 163 is pivotally mounted in a clevis 166 formed integrally with bracket 156.

As will be understood, the operating characteristics of the embodiment shown in Figs. 11 and 12 is similar to those of the first described embodiment. Similarly, the length of wishbone 148 in relation to the free lengths of springs 146, as well as the location of the points of support for these members is determined in accordance with the principles applicable to and described in connection with the first embodiment.

Although specific embodiments of the present invention have been shown and described, it will be evident that various changes in the form, number and arrangement of parts may be made therein within the spirit and scope of the appended claims.

What is claimed is:

1. The combination with a motor vehicle frame, of an individual wheel suspension comprising upper and lower arms projecting outwardly from the frame and hinged at their inner ends to the latter for vertical hinging movement, a king pin extending between the outer ends of the arms, means hingingly connecting opposite ends of the pin to the outer ends of the arms respectively so as to enable vertical hinging movement of the arms with respect to the pin but effective to prevent axial rotation of said king pin, and including separate, apertured blocks connected to the arms and into which the ends of the pin are threaded, and a wheel axle projecting laterally from the pin.

2. The combination with a motor vehicle frame, of an individual wheel suspension comprising upper and lower arms extending outwardly from the frame and hinged at their inner ends to the latter for hinging movement in a vertical direction, a king pin extending vertically between the outer ends of the arms and serving to hold said ends in vertically spaced relation, means hingingly connecting opposite ends of the pin to the outer ends of the arms respectively so as to enable vertical hinging of the arms with respect to the pin but effective to prevent axial rotation of said king pin, and a wheel axle projecting from the pin and having a tubular portion receiving a part of the pin so as to enable turning of the axle on the pin, said tubular portion being internally threaded and the pin therein being threaded thereinto so as to provide a threaded, rotary bearing engagement.

3. The combination with a motor vehicle frame, of an individual wheel suspension comprising upper and lower arms projecting outwardly from the frame and hinged at their inner ends to the latter for vertical hinging movement, a king pin extending between the outer ends of the arms and serving to hold said ends in predetermined spaced relation, said king pin terminating at its upper and lower ends in externally threaded portions, means including a block pivotally connected to the outer end of the lower arm and having a threaded aperture, threadedly receiving the lower threaded end of the pin, so as to enable vertical, pivotal movement of the arm with respect to the block and pin, means including a second lock on the upper arm and having a threaded aperture, pivotally and threadedly receiving the upper end of the pin, for connecting the upper end of the pin to the upper arm and also permitting relative, vertical pivoting movement of the arm and pin, and a wheel axle projecting laterally from the pin intermediate its threaded ends, the threads on the pin serving to take the upward and downward thrust loads imparted by the arms and axle.

4. The combination with a motor vehicle frame, of an individual wheel suspension comprising upper and lower arms extending outwardly from the frame and hinged at their inner ends to the latter for hinging movement in a vertical direction, a king pin extending vertically between the outer ends of the arms and serving to hold said ends in predetermined vertically spaced relation, means in the connections between the ends of the pin and the arms for enabling relative vertical hinging movement of the arms and the pin, means included in the connecting means between one arm and the pin for varying the camber of the pin, a wheel axle projecting laterally from the pin, and rotative threaded bearing means enabling turning of the axle about the longitudinal axis of the pin and adapted to take the vertical thrust load between the axle and pin.

5. The combination with a motor vehicle frame, of an individual wheel suspension comprising upper and lower arms extending outwardly from the frame and hinged at their inner ends to the latter for hinging movement in a vertical direction, a king pin extending vertically between the outer ends of the arms and serving to hold said ends in predetermined vertically spaced relation, means connecting one end of the pin to one of the arms for enabling relative vertical hinging movement of the arm and pin, a pin rotatably journaled in the outer end of the other arm and having an eccentrically arranged portion, means on the other end of the king pin for adjustably receiving the eccentrically arranged portion whereby the camber angle of the king pin may be varied, a wheel axle projecting laterally from the king pin, and bearing means enabling turning of the axle about the longitudinal axis of the pin.

6. The combination with a motor vehicle frame, of an individual wheel suspension comprising upper and lower arms extending outwardly from the frame and hinged at their inner ends to the latter for hinging movement in a vertical direction, a king pin extending vertically between the outer ends of the arm and serving to hold said ends in predetermined vertically spaced relation, means including a threaded pivotal connection between the outer end of one arm and the adjacent end of the pin for connecting the arm and pin and enabling relative vertical hinging movement of the arm and pin, a pin having a threaded pivotal engagement with the outer end of the other arm, and having an eccentric portion, means on the adjacent end of the king pin and adjustably receiving the eccentric portion so as to enable varying the camber angle of the king pin, a wheel axle extending laterally from the king pin, and threaded bearing means enabling turning of the axle about the longitudinal axis of the pin.

7. The combination with a motor vehicle frame, of an individual wheel suspension comprising upper and lower arms extending outwardly from the frame and hinged at their inner ends to the latter for hinging movement in a vertical direction, a king pin extending vertically between the outer ends of the arms and serving to hold said ends in a predetermined vertically spaced relation, means in the connections between the ends of the pin and the arms for enabling relative vertical hinging movement of the arms and pin, and including a substantially horizontal and offset end portion on one end of the pin having a threaded pivotal engagement with the outer end of the adjacent arm, a wheel axle projecting laterally from the pin, and bearing means enabling turning of the axle about the longitudinal axis of the pin.

8. The combination with a motor vehicle frame, of an individual wheel suspension comprising upper and lower arms extending outwardly from the frame, a wheel mounting pin extending vertically between the outer ends of the arms, and means connecting the upper and lower ends of the pin with the outer ends of the arms for enabling relative vertical movement of the pin and the arms, said means connecting one end of the pin to one of the arms including a substantially horizontal offset end of the pin operatively journaled in the outer end of the arm.

9. The combination with a motor vehicle frame, of an individual wheel suspension comprising upper and lower arms extending outwardly from the frame, a king pin extending vertically between the outer ends of the arms and serving to hold them in vertically spaced relation, means connecting the ends of the pin to the ends of the arms for enabling vertical hinging movement of the arms with respect to the pin but effective to prevent axial rotation of said king pin, a wheel axle projecting laterally from the pin, threaded bearing means enabling turning of the axle about the longitudinal axis of the pin, and take-up means for reducing the play in the threaded bearing means so as to compensate for wear and provide a closely interfitting threaded bearing engagement.

10. The combination with a motor vehicle frame, of an individual wheel suspension comprising upper and lower arms projecting outwardly from the frame and hinged at their inner ends to the latter for vertical hinging movement, a king pin extending between the outer ends of the arms and having its opposite ends externally threaded, means engaging each threaded end of the pin and connected to the outer end of the adjacent arm for enabling the pin and arms to hingingly move relatively during vertical hinging movement of the arms, but effective to prevent axial rotation of said king pin, a wheel axle mounted on the pin and projecting laterally therefrom, and means forming a threaded bearing between said axle and said pin to permit steerable turning of said axle, the threads of said bearing acting to take the thrust loads between said pin and said axle.

JOHN W. LEIGHTON.